United States Patent
Huang et al.

(10) Patent No.: US 10,698,466 B2
(45) Date of Patent: Jun. 30, 2020

(54) POWER DISCHARGE CONTROL DEVICE, CIRCUIT AND METHOD USING THE SAME

(71) Applicant: Wistron Corporation, New Taipei (TW)

(72) Inventors: Po-Yen Huang, New Taipei (TW); Mei-Ling Shang, New Taipei (TW); Sin-Fang Wang, New Taipei (TW); Tzu-Chieh Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 135 days.

(21) Appl. No.: 15/844,612

(22) Filed: Dec. 17, 2017

(65) Prior Publication Data
US 2018/0373301 A1    Dec. 27, 2018

(30) Foreign Application Priority Data

Jun. 26, 2017 (CN) .......................... 2017 1 0493724

(51) Int. Cl.
*G06F 1/30* (2006.01)
(52) U.S. Cl.
CPC ....................... *G06F 1/30* (2013.01)
(58) Field of Classification Search
CPC ............................................. G06F 1/30
USPC ................. 363/52; 361/54; 307/99
See application file for complete search history.

(56) References Cited

U.S. PATENT DOCUMENTS

| | | | | |
|---|---|---|---|---|
| 7,839,026 B2* | 11/2010 | Huang | ................. | H05K 9/0067 307/99 |
| 8,102,631 B2* | 1/2012 | Zhou | .......................... | G06F 1/30 361/54 |
| 9,786,371 B1* | 10/2017 | Lee | ........................ | G11C 15/046 |
| 10,141,925 B1* | 11/2018 | Huang | ................. | H03K 17/668 |
| 2005/0283942 A1* | 12/2005 | Palazzolo | ................. | A47L 5/14 15/347 |
| 2007/0157034 A1* | 7/2007 | Ren | ........................... | G06F 1/30 713/300 |
| 2008/0192517 A1* | 8/2008 | Lin | .................... | H02M 3/33592 363/52 |
| 2010/0308875 A1* | 12/2010 | Fitzgerald | ............ | H03K 17/223 327/142 |
| 2011/0109322 A1* | 5/2011 | Shi | ......................... | H04N 17/04 324/555 |
| 2011/0154502 A1* | 6/2011 | Prakash | ................ | G06F 1/1677 726/26 |
| 2013/0250633 A1* | 9/2013 | Wang | ....................... | H03L 5/00 363/49 |

(Continued)

FOREIGN PATENT DOCUMENTS

| | | |
|---|---|---|
| CN | 101583232 A | 11/2009 |
| CN | 101876846 A | 11/2010 |
| CN | 205176784 U | 4/2016 |

*Primary Examiner* — Aurel Prifti
(74) *Attorney, Agent, or Firm* — Winston Hsu

(57) ABSTRACT

A power discharge control device for a computer system is disclosed. The power discharge control device includes a control unit for generating a control signal corresponding to a pin signal of the computer system, and a discharge unit coupled to the control unit, for executing a power discharge process of the computer system according to the control signal, wherein the pin signal is generated when the computer system is shut down normally or powered off abnormally.

15 Claims, 2 Drawing Sheets

(56) References Cited

U.S. PATENT DOCUMENTS

2018/0013292 A1\* 1/2018 White ............... H01L 31/02021
2018/0181184 A1\* 6/2018 Ye ............................. G06F 1/30

\* cited by examiner

POWER DISCHARGE CONTROL DEVICE, CIRCUIT AND METHOD USING THE SAME

BACKGROUND OF THE INVENTION

1. Field of the Invention

The present invention relates to a power discharge control device, circuit and method using the same, more particularly, to a power discharge control device, circuit and method controlled by a signal of the computer system.

2. Description of the Prior Art

When a computer system is tripped or powered off for unknown reasons, alternating current (AC) loss may happen. If a power management setting of a basic input/output system (BIOS) of the computer system is set as "automatic", and an internal power supplier of the computer system cannot finish discharging remaining spared power in a specific period of time, then, when the computer system resumes power and restarts, BIOS may generate misjudgments because of the remaining power and further cause false operations. In such a situation, the false operations of the computer system may violate the power management setting of the computer system and result in abnormal operations when the power resumes and the computer system is powered on.

Therefore, how to solve the above mentioned problems to avoid false operations caused by misjudgments of the computer system has become an important work in the scope.

SUMMARY OF THE INVENTION

Therefore, the present invention provides a power discharge control device, power discharge circuit and power discharge control method to execute a power discharge process according to a signal of a computer system, so as to avoid abnormal operations when power resumes and the computer system is powered on.

An embodiment of the present invention discloses a power discharge control device, for a computer system comprising a control unit, for generating a control signal corresponding to a pin signal of the computer system; and a discharge unit, coupled to the control unit, for executing a power discharge process of the computer system according to the control signal; wherein the pin signal is generated when the computer system is shut down normally or powered off abnormally.

An embodiment of the present invention discloses a power discharge circuit, comprising a diode, coupled to a voltage source; a capacitor, coupled to the diode; a control unit, coupled to the diode and the capacitor, for generating a control signal corresponding to a pin signal of a computer system; and a discharge unit, coupled to the control unit, for executing a power discharge process of the computer system according to the control signal; wherein the pin signal is generated when the computer system is shut down normally or powered off abnormally.

An embodiment of the present invention discloses a power discharge control method, for a computer system, comprising generating a control signal corresponding to a pin signal of the computer system; and executing a power discharge process of the computer system according to the control signal; wherein the pin signal is generated when the computer system is shut down normally or powered off abnormally.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
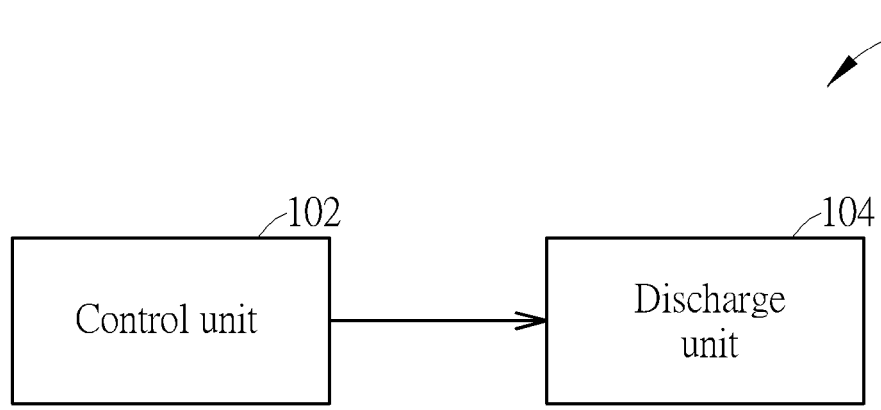
FIG. 1 is a schematic diagram of a power discharge control device according to an embodiment of the present invention.

Please refer to FIG. 1, which is a schematic diagram of a power discharge control device 10 according to an embodiment of the present invention. The power discharge control device 10 is utilized for a computer system to perform power discharge process. The power discharge control device 10 includes a control unit 102 and a discharge unit 104. The control unit 102 generates a control signal according to a pin signal of the computer system. The discharge unit 104 is coupled to the control unit 102, for executing the power discharge process of the computer system according to the control signal generated by the control unit 102. Note that, the pin signal is generated by the computer system when the computer system is shut down normally or powered off abnormally. Therefore, when the computer system is shut down normally or powered off abnormally, the power discharge control device 10 may control the control unit 102 to control the discharge unit 104 to perform the power discharge process, and avoid abnormal circumstances of the computer system caused by false operations when the computer system is shut down normally or powered off abnormally.

In detail, in an embodiment, the control unit 102 may be implemented by a Timer 555 IC, for transforming the pin signal with a low voltage level generated by the computer system, e.g. a sleep state S5 signal (SLP_S5_N) of advanced configuration and power interface (ACPI), into a control signal 555_Output with a high voltage level when the computer system is shut down normally or powered off abnormally, and transmitting the control signal 555_Output to the discharge unit 104. For example, the control unit 102 transforms the pin signal SLP_S5_N with a voltage level 0V into the control signal 555_Output with a voltage level 5V, and not limited thereto. Note that, implementation of the control unit 102 is not limited to the Timer 555 IC, and an apparatus may be applied to the present invention as long as the apparatus is capable of transforming the pin signal SLP_S5_N, generated by the computer system, into the signal with the high voltage level. The discharge unit 104 executes the power discharge process according to the control signal 555_Output generated by the control unit 102, wherein the discharge unit 104 may be implemented by a combination of a switch unit, e.g., a transistor or switch apparatus, resistor or other passive elements, so as to perform the power discharge process. Therefore, when the computer system is shut down normally or powered off abnormally, the control unit 102 controls the discharge unit 104 to execute the power discharge process according to the control signal generated by the pin signal of the computer system, so as to avoid abnormal circumstances of the computer system when restarting.

The embodiments stated in the above are utilized for illustrating that the control unit 102 of the present invention controls the discharge unit 104 to perform the power discharge process according to the control signal generated by the pin signal of the computer system. Note that, those skilled people in the art may make modifications and alternations to the computer system according to different system requirements. For example, according to requirements of different manufacturers or computer systems, applying other chips or apparatuses different with the Timer 555 IC may be chosen, the pin signal of the computer system is not limited to the low voltage level, signals with the high voltage level may be applied thereto, or different passive elements may be utilized to implement the discharge device so as to execute the power discharge process of the computer system. The above mentioned embodiments may be modified according to instructions of the users or manufacturers, or settings of the computer system, and not limited thereto, all belonging to the scope of the present invention.

Figure 2:
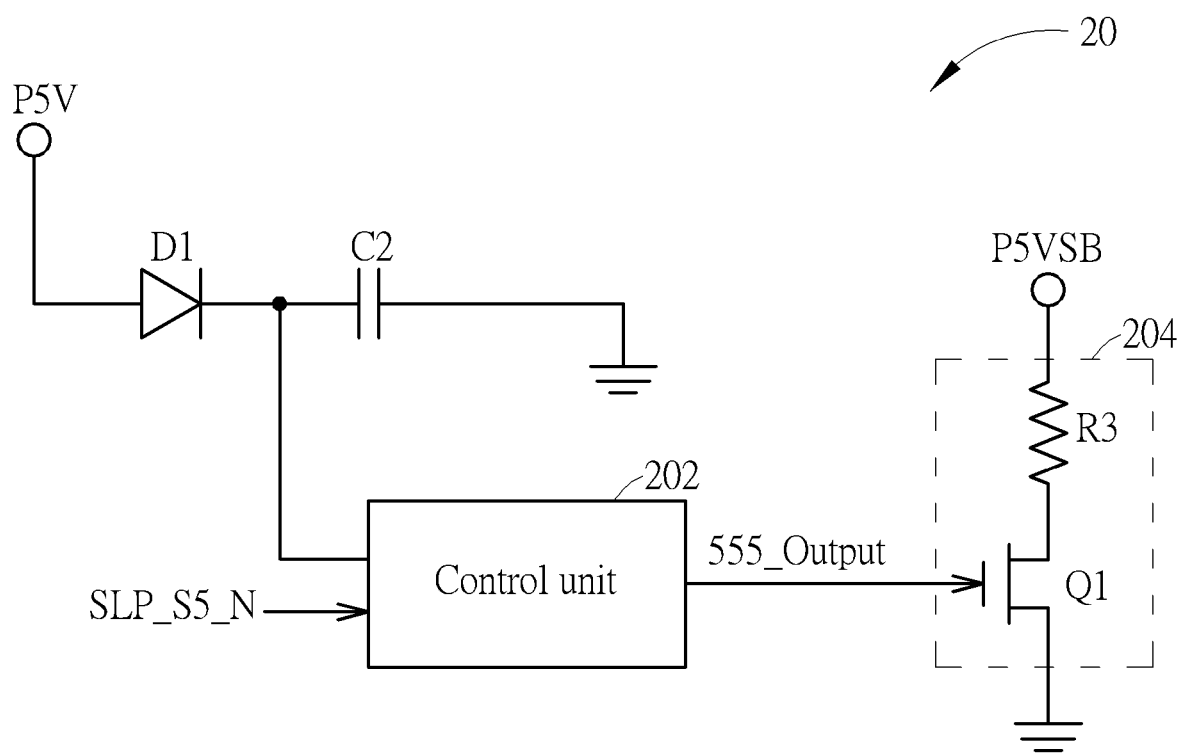
FIG. 2 is a schematic diagram of a power discharge circuit according to an embodiment of the present invention.

Please refer to FIG. 2, which is a schematic diagram of a power discharge circuit 20 according to an embodiment of the present invention. The power discharge circuit 20 is utilized for implementing the power discharge control device 10, so as to perform the power discharge process of the computer system. The power discharge circuit 20 includes a voltage source P5V, a diode D1, a capacitor C2, a spare voltage source PSVSB, a control unit 202 and a discharge unit 204. In this embodiment, the voltage source P5V is a P5V voltage source identical with the computer system, for providing a voltage source for the computer system and the power discharge circuit 20. The diode D1 is coupled to the voltage source P5V, and the capacitor C2 is coupled to the diode D1, for storing the voltage source provided by the voltage source P5V to provide the voltage source for the power discharge circuit 20 when the voltage source P5V does not provide the voltage source (i.e. when the computer system is powered off abnormally). That is, when the computer system is shut down normally, the voltage source P5V provides the voltage source for the control unit 202 and the discharge unit 204. When the computer system is powered off abnormally, the capacitor C2 provides the voltage source for the control unit 202 and the discharge unit 204. The control unit 202 is coupled to the diode D1 and the capacitor C2. In this embodiment, the control unit 202 is implemented by a Timer 555 IC, for receiving a pin signal SLP_S5_N generated by the computer system when the computer system is shut down normally or powered off abnormally, and generating a corresponding control signal 555_Output according to the pin signal SLP_S5_N and then transmitting the control signal 555_Output to the discharge unit 204. Note that, the pin signal SLP_S5_N has a low voltage level, and the control signal 555_Output has a high voltage level relative to the pin signal SLP_S5_N. The discharge unit 204 is coupled to the spared voltage source PSVSB, which includes a switch unit Q1 and a discharge resistor R3, for conducting the switch unit Q1 when receiving the control signal 555_Output and executing the power discharge process for the spared voltage source PSVSB via the discharge resistor R3.

In an embodiment, when the computer system is shut down normally, the voltage source P5V provides the voltage source for the control unit 202 and the discharge unit 204, and meanwhile, the control unit 202 receives the pin signal SLP_S5_N from the computer system, and accordingly generates the control signal 555_Output to the discharge unit 204. The discharge unit 204 conducts the switch unit Q1 according to the control signal 555_Output, such that the discharge resistor R3 executes the power discharge process of the spared voltage source PSVSB in a specific period of time (e.g. in 4 seconds) to prevent the computer system from risk of damage and extends the system life. In another embodiment, when the computer system is powered off abnormally, the capacitor C2 provides the voltage source for the control unit 202 and the discharge unit 204, and meanwhile, the control unit 202 receives the pin signal SLP_S5_N from the computer system, and accordingly generates the control signal 555_Output to the discharge unit 204. The discharge unit 204 conducts the switch unit Q1 according to the control signal 555_Output, such that the discharge resistor R3 executes the power discharge process of the spared voltage source PSVSB in the specific period of time (e.g. in 2.5 seconds), and the computer system would not keep consuming power, to reduce meaningless power consumption of the computer system as low as possible when the computer system is powered off. Notably, based on the system requirements of the computer system, the period time of the power discharge process of the spared voltage source PSVSB may be adjusted by adjusting a resistance of the discharge resistor R3, so as to achieve a goal of protecting the computer system. Moreover, the power discharge process executed by the discharge unit 204 may be modified according to the applied circuits or the computer system, and not limited to the power source of 5V. Therefore, the power discharge circuit 20 of the present invention is capable of controlling the discharge unit 204 by the control unit 202 to execute the power discharge process of the spared voltage source PSVSB when the computer system is shut down normally or powered off abnormally, so as to avoid the abnormal circumstances of the computer system when restarting.

Figure 3:
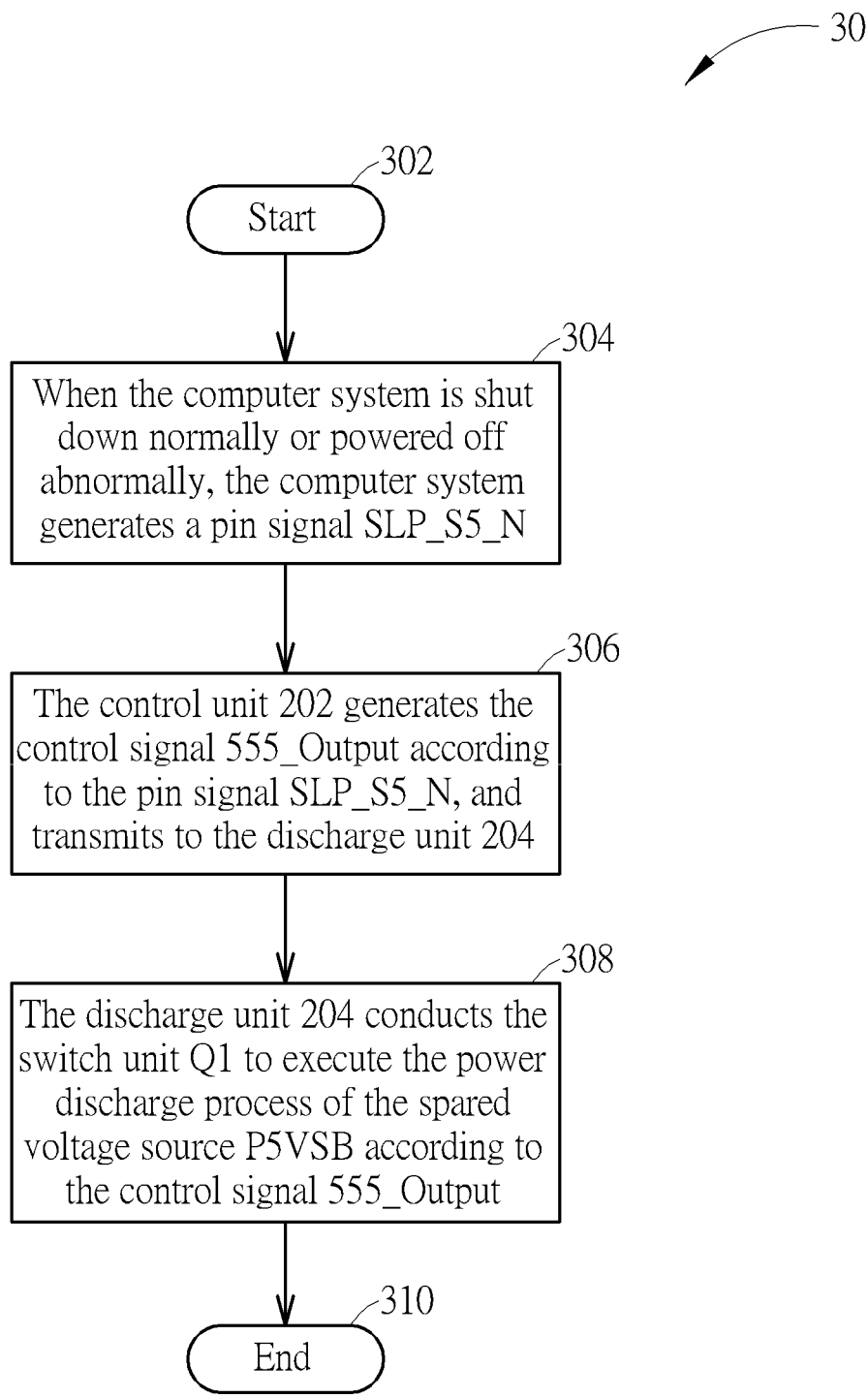
FIG. 3 is a schematic diagram of a process according to an embodiment of the present invention.

The operation process of the power discharge circuit 20 mentioned above may be concluded into a process 30, as shown in FIG. 3. FIG. 3 is a schematic diagram of the process 30 according to an embodiment of the present invention. The process 30 includes the following steps:

Step 302: Start.

Step 304: When the computer system is shut down normally or powered off abnormally, the computer system generates a pin signal SLP_S5_N.

Step 306: The control unit 202 generates the control signal 555_Output according to the pin signal SLP_S5_N, and transmits to the discharge unit 204.

Step 308: The discharge unit 204 conducts the switch unit Q1 to execute the power discharge process of the spared voltage source PSVSB according to the control signal 555_Output.

Step 310: End.

As can be known from the above, the power discharge control device of the present invention may execute the power discharge process of the spare voltage source according to the pin signal of the computer system. Notably, the embodiments stated above illustrates the concept of the present invention, those skilled in the art may make proper modifications accordingly, and not limited thereto. For example, the capacitance of the capacitor C2 and the resistance of the discharge resistor R3 may be adjusted according to the system requirements, so as to finish the power discharge process in the specific time period, or the pin signal of the control signal generated by the control unit is not limited to the low voltage level. Control units or apparatuses capable of transforming the pin signal of the computer system from the low voltage level into the high voltage level or from the high voltage level into the low voltage level are all belong to the scope of the present invention.

In summary, the present invention provides a power discharge control device, for executing the power discharge process according to the pin signal of the computer system when the computer system is shut down normally or powered off abnormally, so as to avoid the computer system from keeping consuming power when the computer system is powered off and avoid the abnormal circumstances when restarting the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power discharge control device, for a computer system, comprising:
    a control unit, for generating a control signal according to a power source and a pin signal of the computer system;
    a discharge unit, coupled to the control unit, for executing a power discharge process of the computer system according to the control signal;
    wherein the pin signal is generated when the computer system is shut down normally or powered off abnormally;
    wherein the power discharge process discharges through a resistor in a specific period of time; and
    wherein the pin signal is a sleep state signal of advanced configuration and power interface (ACPI) generated by the computer system.

2. The power discharge control device of claim 1, wherein the pin signal has a first voltage level and the control signal has a second voltage level.

3. The power discharge control device of claim 2, wherein the first voltage level is a high voltage level and the second voltage level is a low voltage level relative to the first voltage level.

4. The power discharge control device of claim 1, wherein the discharge unit conducts a switch unit according to the control signal, so as to execute the power discharge process via a discharge resistor.

5. The power discharge control device of claim 4, wherein the switch unit is a transistor.

6. A power discharge circuit, comprising:
    a diode, coupled to a voltage source;
    a capacitor, coupled to the diode;
    a control unit, coupled to the diode and the capacitor, for generating a control signal according to a power source and a pin signal of a computer system;
    a discharge unit, coupled to the control unit, for executing a power discharge process of the computer system according to the control signal;
    wherein the pin signal is generated when the computer system is shut down normally or powered off abnormally;
    wherein the power discharge process discharges through a resistor in a specific period of time; and
    wherein the pin signal is a sleep state signal of advanced configuration and power interface (ACPI) generated by the computer system.

7. The power discharge circuit of claim 6, wherein the pin signal has a first voltage level and the control signal has a second voltage level.

8. The power discharge circuit of claim 7, wherein the first voltage level is a high voltage level and the second voltage level is a low voltage level relative to the first voltage level.

9. The power discharge circuit of claim 6, wherein the discharge unit conducts a switch unit to execute the power discharge process via a discharge resistor.

10. The power discharge circuit of claim 9, wherein the switch unit is a transistor.

11. A power discharge control method, for a computer system, comprising:
    generating a control signal according to a power source and a pin signal of the computer system;
    executing a power discharge process of the computer system according to the control signal;
    wherein the pin signal is generated when the computer system is shut down normally or powered off abnormally;
    wherein the power discharge process discharges through a resistor in a specific period of time; and
    wherein the pin signal is a sleep state signal of advanced configuration and power interface (ACPI) generated by the computer system.

12. The power discharge control method of claim 11, wherein the pin signal has a first voltage level and the control signal has a second voltage level.

13. The power discharge control method of claim 12, wherein the first voltage level is a high voltage level and the second voltage level is a low voltage level relative to the first voltage level.

14. The power discharge control method of claim 11, wherein the control signal conducts a switch unit to execute the power discharge process via a discharge resistor.

15. The power discharge control method of claim 14, wherein the switch unit is a transistor.

* * * * *